United States Patent  [19]
Becker

[11] Patent No.: US 6,247,297 B1
[45] Date of Patent: Jun. 19, 2001

(54) JACKKNIFE SUPPORT SYSTEM FOR A COMBINE CORNHEAD

(75) Inventor: Aaron T. Becker, Cambridge, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/378,518

(22) Filed: Aug. 20, 1999

(51) Int. Cl.$^7$ ................................................ A01D 45/02
(52) U.S. Cl. .............................................. 56/119; 56/314
(58) Field of Search ..................... 56/12.8, 14.1, 56/14.3, 14.6, 16.6, 98, 51, 106, 105, 119, 118, 314, 364, 94, DIG. 1; 460/16, 73

(56) References Cited

U.S. PATENT DOCUMENTS

| | | | |
|---|---|---|---|
| 1,852,702 | * 4/1932 | Coultas et al. | ............ 56/119 |
| 3,982,384 | 9/1976 | Rohweder et al. | . |
| 4,403,467 | 9/1983 | Baugh | . |
| 4,446,682 | 5/1984 | Jennen et al. | . |
| 4,493,181 | * 1/1985 | Glandenning et al. | ............ 56/314 |
| 4,538,404 | 9/1985 | Heimark, Jr. et al. | . |
| 4,700,537 | 10/1987 | Emmert | . |
| 4,757,673 | * 7/1988 | Gayman | ............ 56/314 |
| 5,195,309 | 3/1993 | Mossman | . |
| 5,787,697 | * 8/1998 | Post | ............ 56/119 |
| 5,865,019 | * 2/1999 | Hurlburt et al. | ............ 56/119 |
| 5,910,092 | * 6/1999 | Bennett | ............ 56/119 |

OTHER PUBLICATIONS

Excerpt from a brochure believed to be distributed in the United States by Deere & Company, 8/97.

Excerpt from a brochure believed to be distributed in the United States by New Holland North America, Inc. (no date).

* cited by examiner

*Primary Examiner*—Robert E. Pezzuto
(74) *Attorney, Agent, or Firm*—Brinks Hofer Gilson & Lione

(57) ABSTRACT

A jackknifing row unit for a combine cornhead comprising a hood pivotally connected between a divider and a row unit frame. A four-bar linkage formed by a tension member and a compression member interconnected between the hood and the row unit frame supports the divider. The four-bar linkage is movable between the row unit operating position and the jackknifed storage position.

26 Claims, 6 Drawing Sheets

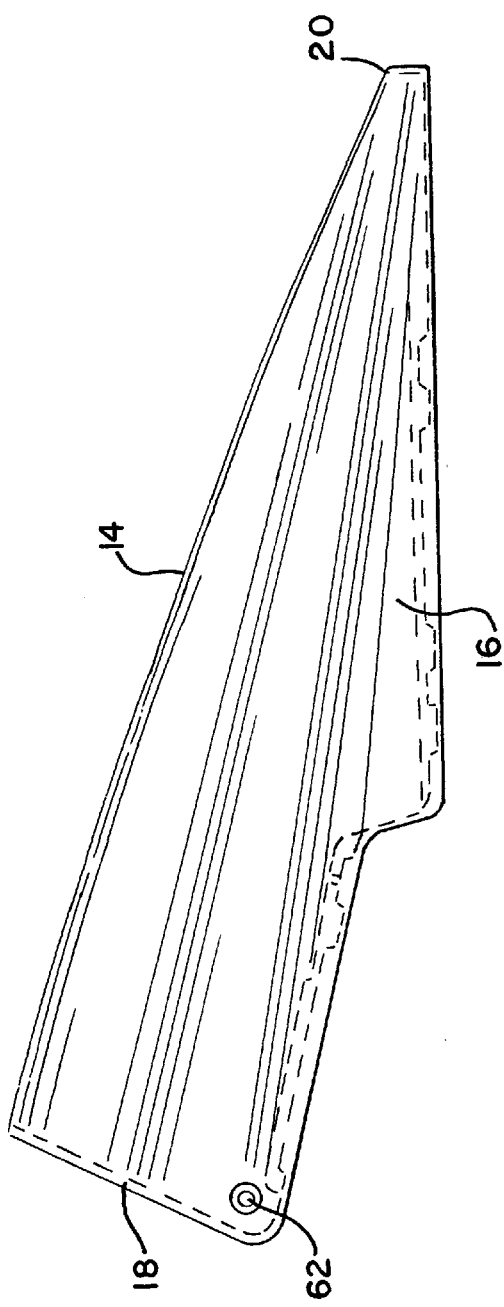
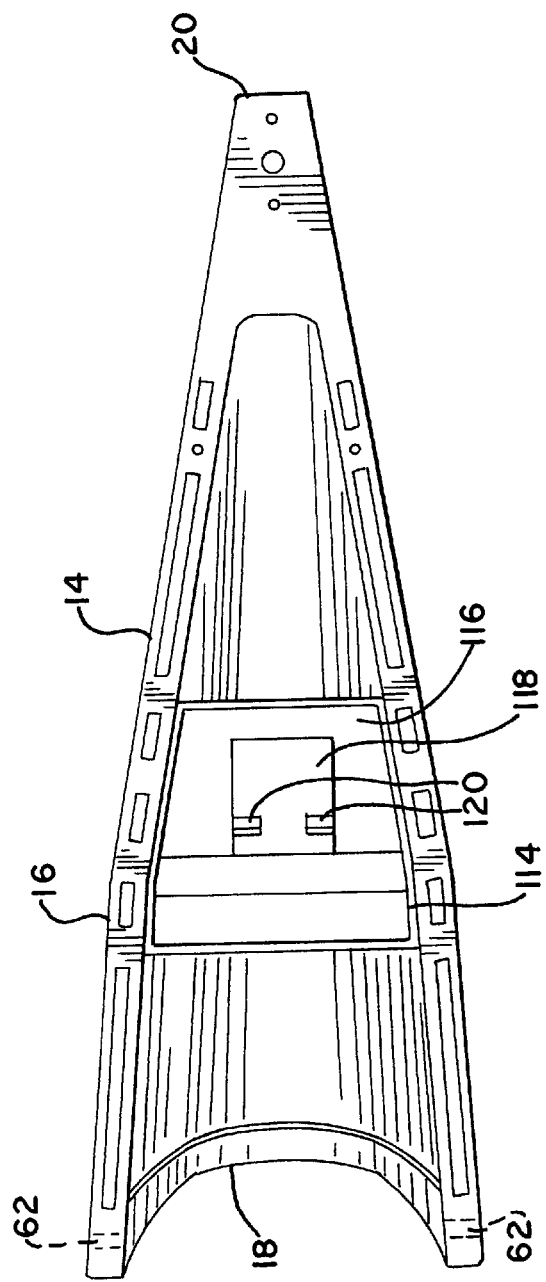

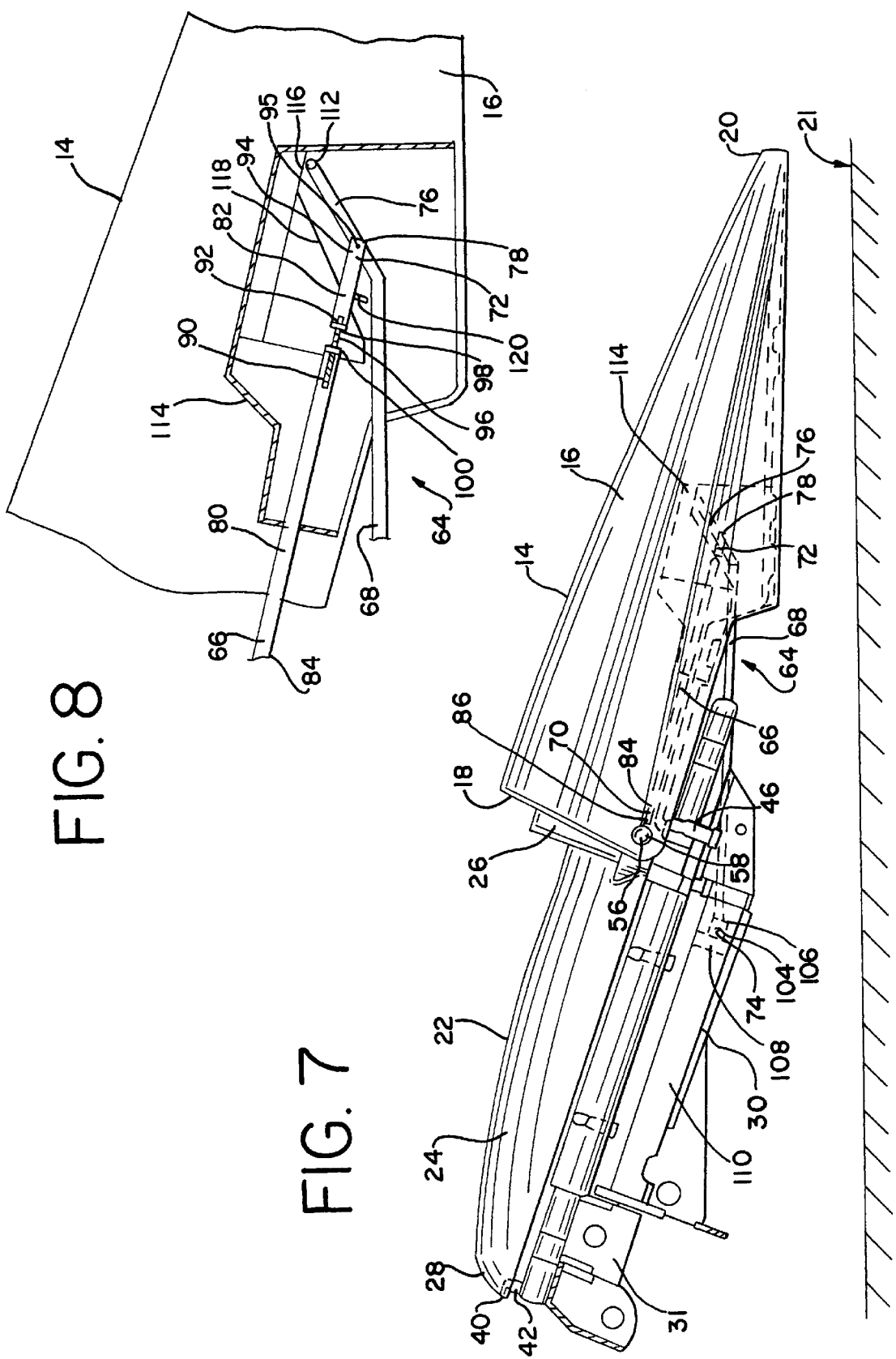

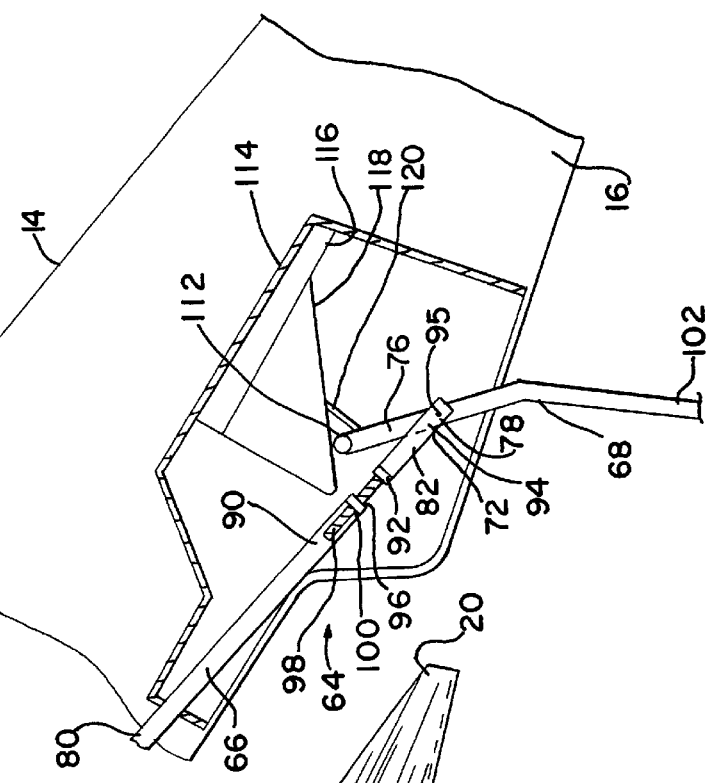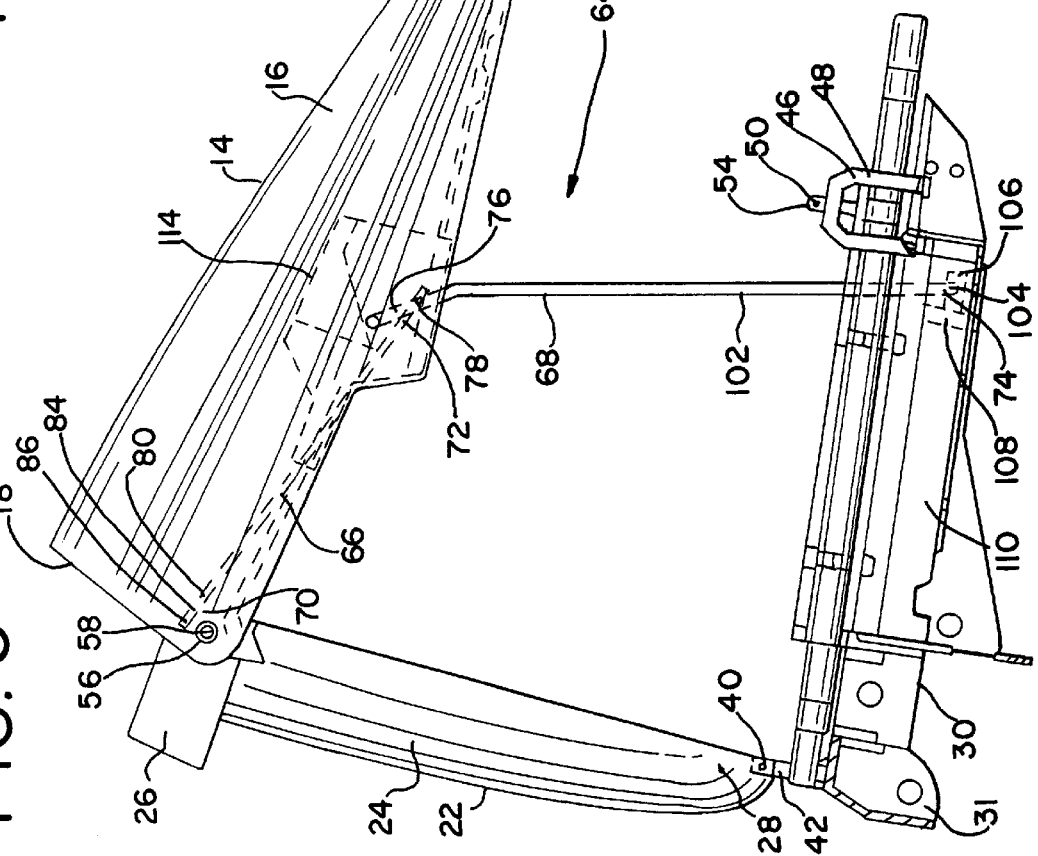

JACKKNIFE SUPPORT SYSTEM FOR A COMBINE CORNHEAD

FIELD OF THE INVENTION

This invention relates generally to the field of harvesting combines and, in particular, to a combine head apparatus used to gather row crops.

BACKGROUND OF THE INVENTION

Combines are used to harvest agricultural crops. As the combine is driven through the crops, the combine cuts the crop, separates the desired crop from the undesired waste, stores the crop, and discards the waste. A head is mounted to the front of the combine to gather the crop and feed the crop into the combine for processing. Each type of head is designed to be used with a particular type of crop. For example, many crops are grown in rows. One such type of row crop is corn.

Row crop heads include a plurality of tapered dividers spaced along the front of the combine. The dividers are aligned parallel and adjacent to one another. The dividers are spaced so that each divider is positioned between a pair of crop rows. Each pair of adjacent dividers therefore straddles a single row of crops. The row crop head also includes a plurality of hoods that extend rearward from the dividers. For corn, ear strippers may also be included between each of the adjacent hoods. As the combine is driven along the crop rows, the dividers direct the crops into a gap located between each pair of dividers and hoods. The ears are then removed from the stalks by the ear strippers and guided into the combine for processing.

It is often necessary to service or clean the row crop head. This often requires the removal of the divider and hood assemblies from the head frame on which they are supported. In addition, the divider and hood assemblies must usually be raised from their normal operating position to permit the combine to be driven or transported between fields. In the past, this has usually been accomplished by removing several of the connections between the frame and each divider and hood assembly. The divider and hood assembly is then lifted and either removed or propped up in a collapsed, jack-knifed position on top of the frame. Examples of divider and hood assemblies that can be collapsed on top of the frame are described in U.S. Pat. No. 5,195,309 to Mossman and U.S. Pat. No. 4,446,682 to Jennen et al.

The collapsible divider and hood assemblies of the prior art have several disadvantages. First, they typically require the removal of several connectors between the frame and both the hood and the divider. This can be a time consuming and difficult task because of the limited spacing between adjacent divider and hood assemblies. Second, propping the collapsed divider and hood assembly on top of the frame does not provide unobstructed access to the various components of the row crop head. For example, the dividers, even in the collapsed position, still inhibit access to the auger at the rear of the row crop head that feeds the crop into the combine. Third, propping the collapsed divider and hood assembly on top of the frame typically entails inserting the front point of the divider into a bracket on the frame. In this configuration, the divider assembly is subjected to undo stresses, particularly during transport of the combine.

There is consequently a need for a divider and hood assembly that can be easily and quickly disconnected and raised up off of the head frame. Moreover, there is a need for a divider and hood assembly that can be placed into a position above the head frame that is stable and provides unobstructed access to the row crop head components. There is also a need for a divider and hood assembly that can be collapsed for transport without be subjected to any undo stresses.

BRIEF SUMMARY OF THE INVENTION

The present invention provides a support system for the row units on a combine cornhead. The support system allows the hood and divider assemblies for each row unit to be moved between an operating position and a jackknifed storage position without removal or disconnection of the hood or the divider.

The jackknifing row unit of the present invention comprises a hood pivotally connected between a divider and a row unit frame. A four-bar linkage formed by a tension member and a compression member interconnected between the hood and the row unit frame supports the divider. The four-bar linkage is movable between the row unit operating position and the jackknifed storage position.

The preferred embodiment of the invention includes features in addition to those listed above. Moreover, the advantages over the current art discussed above are directly applicable to the preferred embodiment, but are not exclusive. The other features and advantages of the present invention will be further understood and appreciated when considered in relation to the detailed description of the preferred embodiment.

BRIEF DESCRIPTION OF SEVERAL VIEWS OF THE DRAWINGS

FIG. 2 is a side view of an interior divider that may be used with the jackknife support system of the present invention.

FIG. 3 is a bottom view of the interior divider shown in FIG. 2.

FIG. 7 is a side view of the divider/hood assembly and jackknife support system of the present invention in the operating position.

FIG. 8 is an enlarged sectional detail of the divider support bracket shown in FIG. 7 taken along the approximate centerline of the divider/hood assembly.

FIG. 9 is a side view of a divider/hood assembly and jackknife support system of the present invention in the jackknifed position.

FIG. 10 is an enlarged sectional detail of the divider support bracket shown in FIG. 8 taken along the centerline of the divider/hood assembly.

DETAILED DESCRIPTION OF THE INVENTION

Figure 1:
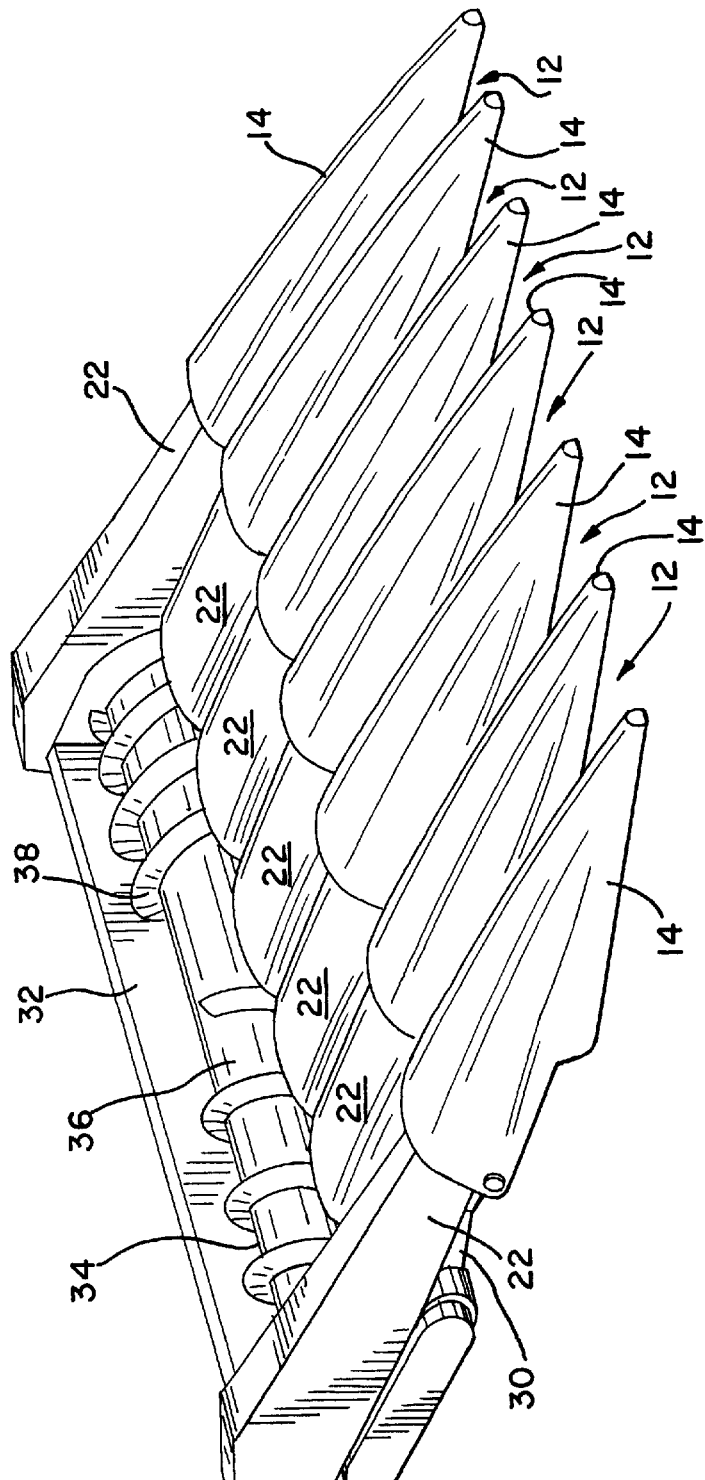
FIG. 1 is a front perspective view of a cornhead on which the jackknife support system of the present invention may be used.

While the present invention will find application in all types of combine row crop heads, the preferred embodiment of the invention is described in conjunction with the cornhead 10 of FIG. 1. The cornhead 10 is mounted on the front of a combine (not shown) and comprises a plurality of "U-shaped" row units 12 spaced along the front of the cornhead 10. The row units 12 are aligned parallel and adjacent to one another, and are spaced so that the "legs" of each row unit 12 straddle a crop row. As will be explained in greater detail below, the adjacent "legs" of each pair of row units 12 support a single divider/hood assembly. The spacing of the row units 12 on some cornheads 10 can be adjusted to match the spacing of the crop rows. In the preferred embodiment shown, the cornhead 10 comprises six row units 12 capable of harvesting six crop rows at a time.

A divider 14 is positioned along the edge of each row unit 12. As the combine is driven along the crop rows, a pair of dividers 14 directs the crops into each row unit 12. The dividers 14 are therefore positioned and shaped so as to guide the crops into the area between adjacent hoods 22. As best seen in FIG. 1, a single divider 14 extends along the adjacent "legs" of each pair of row units 12. In the preferred embodiment shown, the cornhead 10 comprises seven dividers 14, two exterior dividers and five interior dividers. It should be understood that the two exterior dividers only extend along one "leg" of a single row unit 12. As best seen in FIGS. 2 and 3 of the preferred embodiment, each divider 14 has a semi-conical shape and comprises an outer wall 16 bounded at the rearward end of the divider 14 by a semi-circular base 18. The outer wall 16 tapers towards the forward end of the divider 14 and terminates in a gathering point 20. The outer wall 16 is generally formed from a single or double wall of either sheet metal or molded plastic. As best seen in FIG. 7, the gathering point 20 of the divider 14 is normally positioned near the ground 21 so as to lift and straighten any bent or low lying crops. In the preferred embodiment shown, the angle of the divider 14 can be changed to adjust the height of the gathering point 20 relative to the ground.

Figure 4:
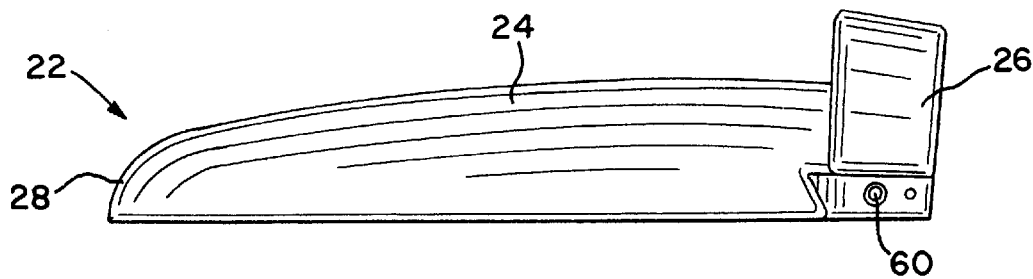
FIG. 4 is a side view of an interior hood that may be used with the jackknife support system of the present invention.
Figure 5:
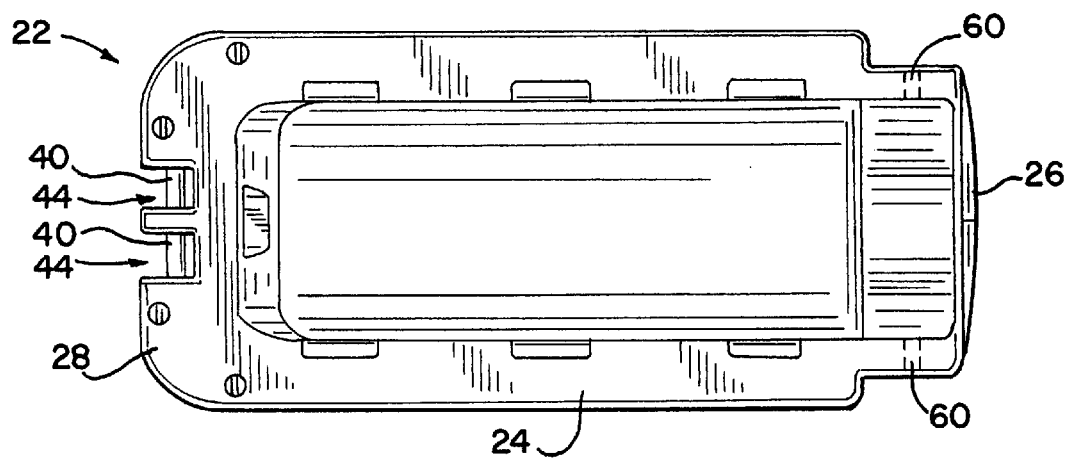
FIG. 5 is a bottom view of the interior hood shown in FIG. 4.
Figure 6:
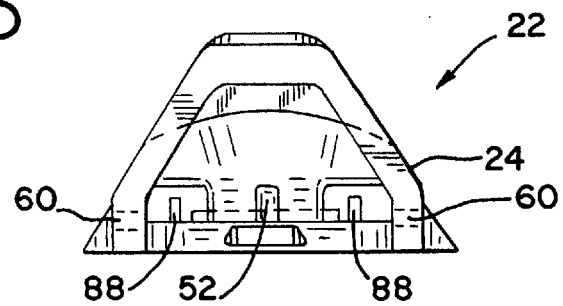
FIG. 6 is a front view of the interior hood shown in FIG. 4.

As best seen in FIG. 1, a hood 22 is positioned rearward of the divider 14. The hood 22 further directs the crops towards the back of the cornhead 10. The hood 22 also encloses and protects the machinery used to gather and harvest the crops. In a similar fashion as the divider 14, a single hood 22 extends along the adjacent "legs" of each pair of row units 12. As best seen in FIGS. 4–6 of the preferred embodiment, the hood 22 is generally semi-circular shaped and comprises a side wall 24 bounded by a forward end 26 and a rearward end 28. The hood 20 is generally formed from a single or double wall of either sheet metal or molded plastic. The forward end 26 of the hood 22 has a radius smaller than the radius of the base 18 of the divider 14. As best seen in FIG. 7, the forward end 26 of the hood 22 is nested inside the base 18 of the divider 14 so as to prevent crops from catching on or getting hung-up by the juncture between the divider 14 and the hood 22.

As will be described in greater detail below, each divider 14 and hood 22 are supported by a row unit frame 30. The rearward end of each of the individual row unit frames 30 are connected to and supported by the transverse header frame 32 of the cornhead 10, which in turn is connected to and supported by the combine. The mechanical connection (not shown) of the cornhead 10 to the combine typically provides for adjustment of the height of the cornhead 10 relative to the combine thereby permitting the cornhead 10 to be raised or lowered relative to the ground 21. This mechanical connection may also permit adjustment of the angle or tilt of the cornhead 10 relative to the combine. Adjustment of the height and/or angle of the cornhead 10 by the combine operator is often necessary to optimize the amount or yield of crop harvest, particularly when operating on uneven or sloped ground. In some combines, sensors and logic circuits are employed to monitor and automatically adjust the position of the cornhead as the combine is driven through the field.

Each row unit 12 further comprises machinery to gather and harvest the crop. In a typical cornhead, each row unit 12 comprises one or more gathering chains (not shown) to gather the corn stalks and one or more snapper rolls and/or ear strippers (not shown) to remove the corn ears from the stalk. The gathering chains are positioned beneath the lower edge of the hood side wall 24 along the gap of each row unit 12. The gathering chains are supported by the row unit frame 30 and typically extend from a distance forward of the base 18 of the divider 14 to near the rearward end 28 of the hood 22. The gathering chain of a typical cornhead 10 has a plurality of fingers spaced along a continuous chain which grasp the corn stalks as they pass into the gap of each row unit 12. The chain is powered by a gear box 31 affixed to the rear of the row unit frame 30. The snapper rolls and ear strippers are typically located near the lower edge of the hood side wall 24 and are likewise supported by the row unit frame 30. The function of the snapper rolls and ear strippers are to separate the corn ears from the stalk. In non-corn row heads the gathering units typically comprise serpentine belts and the harvesting units typically comprise cutting discs. The design and operation of row crop head gathering and harvesting units are well known in the art.

As the crop (in this case, corn) is gathered and harvested it is moved rearward and into a trough 34 located behind the row units 12. The crop is then moved towards the middle of the cornhead 10 by an auger 36 positioned in the trough 34. Any crop collected in the trough 34 is pushed along the length of the trough 34 by the auger flighting 38 as the auger 36 is rotated. As the crop is moved to the middle of the cornhead 10, it is deposited into a feeder housing (not shown) where it is then elevated and fed into the combine for further processing and storage. In a typical combine, the feeder housing comprises an elevator having a series of paddles connected to a continuous chain. As the chain is driven, the paddles collect and move the harvested crop up through the feeder housing. The design and operation of the crop augers, feeder housings, and combine processing components are also well know in the art.

As discussed above, the hood 22 is supported by the row unit frame 30. As best seen in FIGS. 5, 7 and 9, the rearward end 28 of the hood 22 comprises a pair of transverse support rods 40 that are pivotally connected to a bracket 42 mounted near the rearward end of the row unit frame 30. The bracket 42 comprises a casting attached to the top of the gear box 31. In the preferred embodiment shown, open areas or gaps 44 are provided on the rearward end 28 of the hood 22 adjacent to the support rods 40 so as to permit the hood 22 to be pivoted upwards about the support rods 40. Alternatively, a hinge or other suitable mechanical device could provide the pivotal connection between the rearward end 28 of the hood 22 and the row unit frame 30.

As best seen in FIGS. 6, 7 and 9, the forward end 26 of the hood 22 is removably connected to the row unit frame 30 by a latching mechanism 46. In the preferred embodiment shown, the latching mechanism 46 comprises a casting 48 having an upwardly projecting cylindrical member 50. The cylindrical member 50 is received in a corresponding opening or sleeve 52 on the forward end 26 of the hood 22. As can best be seen in FIG. 6, the sleeve 52 is molded or bolted into the interior area of the hood 22. A removable pin 54 passing through the sleeve 52 and the cylindrical member 50 secures the hood 22 to the row unit frame. Removal of the pin 54 unlatches the forward end 26 of the hood 22 from the row unit frame 30 thereby permitting the hood 22 to be raised or pivoted upwardly to permit access to the gathering and harvesting machinery mounted on the row unit frame 30. Other types of mechanical connectors, such as a ball and hitch, can be also used to fasten the forward end 26 of the hood 22 to the row unit frame 30.

As discussed above, the divider 14 is generally supported by the row unit frame 30. As best seen in FIGS. 7 and 9, the base 18 of the divider 14 is pivotally connected to the forward end 26 of the hood 22. In the preferred embodiment shown, the hood/divider connection 56 comprises a rod or pin 58 that passes through sleeves 60 and 62 embedded in the side wall 24 of the hood 22 and the outer wall 16 of the divider 14, respectively (see FIGS. 2–6). The location of sleeves 60 and 62 are best seen in FIGS. 2–5. Brackets (not shown) may be included on the hood 22 and the divider 14 to provide additional support for sleeves 60 and 62. The pivotal connection 56 allows the angle of the divider 14 to be changed relative to the angle of the hood 22. Changing the angle of the divider 14 results in the raising or lowering of the divider gathering point 20.

The forward portion of the divider 14 is supported by the jackknife support system 64. As best seen in FIGS. 7 and 9, the jackknife support system 64 comprises a four-bar linkage formed by the row unit frame 30, the hood 22, the tension member 66, and the compression member 68. The tension member 66 and the compression member 68 are connected between the row unit frame 30 and the hood 22. The tension member 66 comprises a first end 70 and a second end 72, the first end being pivotally connected to the hood 22 at a location near the hood/divider connection 56. The compression member 68 comprises a first end 74 and a second end 76, the first end 74 being pivotally connected to row unit frame 30. The second end 72 of the tension member 66 is pivotally connected to the compression member 68 at a location near the second end 76 of the compression member 68. In the preferred embodiment shown, the tension/compression member connection 78 is offset inwardly from the second end 76 of the compression member 68.

The tension member 66 comprises one or more frames manufactured from metal or steel. In the preferred embodiment, the tension member 66 comprises a U-shaped first frame 80 connected to a second frame or casting 82. The legs 84 of the first frame 80 are pivotally connected to the hood 22 at a location somewhat closer to the forward end 26 of the hood 22 than the hood/divider connection 56. The connection of the legs 84 to the hood 22 comprises a metal bar or pin 86 that passes through the legs 84 and a plurality of flanges 88 affixed to the hood 22 (see FIG. 6). The opposite end 90 of the first frame 80 is connected to a first end 92 of the second frame 82. The other or second end 94 of the second frame 82 is pivotally connected to the compression member 68. One or more bars or pins 95 passing through the second frame 82 and the compression member 68 provides the pivotal tension/compression connection 78.

In the preferred embodiment, the tension member 66 comprises an adjusting mechanism 96 that can be used to change the overall length of the tension member 66. As best seen in FIGS. 8 and 10, the adjusting mechanism 96 comprises a threaded rod or bolt 98 connected between the first and second frames 80 and 82. The head of the bolt 98 rests against an interior face of the second frame 82. The threaded portion of the bolt 98 extends through the first and second frames 80 and 82, and is connected to a nut 100 resting on an interior face of the first frame 80. Rotation of the nut 100 relative to the bolt 98 changes the distance between the first and second frames 80 and 82, thereby changing the overall length of the tension member 66. In the alternative, the adjusting mechanism 96 could comprise overlapping plates connected to the first and second frames 80 and 82. These overlapping plates would include a plurality of alignment holes. Length adjustments would be accomplished by aligning and pinning different sets of alignment holes in the plates.

As discussed above, the compression member 68 comprises a first end 74 and a second end 76, the first end 74 being pivotally connected to row unit frame 30. In the preferred embodiment, the compression member 68 comprises a U-shaped frame manufactured from tubular metal or steel. The legs 102 of the U-shaped frame are connected to the row unit frame 30 by one or more metal bars or pins 104 that pass through the legs 102 and flanges 106 affixed to the row unit frame 30. The flanges 106 are supported by a cross-brace 108 connected between the exterior frame members 110 of the row unit frame 30. The compression member 68 could also include an adjusting mechanism (not shown) to alter the length of the compression member 68.

As discussed above, the forward portion of the divider 14 is supported by the jackknife support system 64. In particular, the second end 76 of the compression member 68 comprises a transverse member 112 that engages a support bracket 114 affixed to the divider 14. As best seen in FIGS. 7–8, the support bracket 114 is connected to the interior face of the divider wall 16, and comprises a operational support plate 116, a sloped glide plate 118, and one or more retaining flanges or ears 120.

The operating position of a divider 14 and hood 22 assembly of the corn head 10 is depicted in FIGS. 7–8. In this position, the forward end 26 of the hood 22 is latched to the row unit frame 30 by the latching mechanism 46. The tension and compression members 66 and 68 both project forward and form a rigid structure that supports the forward portion of the divider 14. As best seen in FIG. 8, the second end 76 of the compression member 68 engages the operational support plate 116 of the divider support bracket 114. The weight of the divider 14 results in a gravitational force being applied in a downward direction onto the second end 76 of the compression member 68. The resultant of this downward force is a compression force along the compression member 68 and a corresponding tension force along the tension member. These forces are subsequently transferred to the row unit frame 30. Because the tension/compression member connection 78 is located inward from the second end 76 of the compression member 68 in the preferred embodiment, the end portion of the compression member 68 is also subjected to bending forces.

As explained above, the angle of the divider 14, and consequently the height of the gathering point 20 relative to the ground 21, can be adjusted by changing the length of the tension member 66. For example, lengthening the tension member 66 will lower the second end 76 of the compression member 68, thereby lowering the gathering point 20 of the divider 14. Because the distance between the divider base 18 and the divider support bracket 114 remains constant, changing the length of the tension member 66 will change the contact point between the second end 76 of the compression member 68 and the operational support plate 116. The operational support plate 116 is therefore provided with a sufficient length to allow for these changes in geometry.

The jackknife position of a divider 14 and hood 22 assembly of the corn head 10 is depicted in FIGS. 9–10. To place the divider 14 and hood 22 assembly in this position, the pin 54 is removed from latching mechanism 46 so as to disconnect the forward end 26 of the hood 22 from the row unit frame 30. A lifting force is then applied to the divider 14 to raise and move the divider 14 in a rearward direction. As the divider 14 is raised, the hood 22 is forced to pivot upwards and rearwards about the support rods 40 located at the rearward end 28 of the hood 14. This movement of the hood 14 causes the compression member 68, by virtue of the interconnected tension member 66, to likewise pivot upwards and rearwards about the first end 74 of the compression member 68. As the compression member 68 pivots upwards and rearwards, the second end 76 of the compression member 68 moves rearwardly relative to the divider support bracket 114. As best seen in FIG. 10, the compression member 68 is pivoted upwards and rearwards until the second end 76 slides along the sloped glide plate 118 and passes behind the retaining ears 120. The lifting force on the divider 14 is then released, thereby allowing the transverse member 112 of the compression member 68 to engage or come to rest against the back of the retaining ears 120. The weight of the divider 14 prevents the compression member 68 from disengaging the retaining ears 120.

Once placed in the jackknife position, the interior components of the row unit 12 are easily accessed for cleaning, maintenance, or inspection. The jackknife position also prevents damage to the divider 14 during transport of the cornhead 10 from one field to another.

To lower the divider 14 and hood 22 assembly, a small lifting force is applied to the divider 14 so as to disengage the compression member 68 from the retaining ears 120. In particular, the front of the divider 14 is lifted to raise the divider support bracket 114 up off of the second end 76 of the compression member 68. The divider 14 is then allowed to move forward until the second end 76 clears or is in front of the retaining ears 120. The divider 14 can then be set back on top of the compression member 68 and lowered into the operating position (FIG. 7). Pin 54 is then reinserted into the latching mechanism 46 to secure the forward end 26 of the hood 22 as well as the base 18 of the divider 14 to the row unit frame 30.

Figure 11:
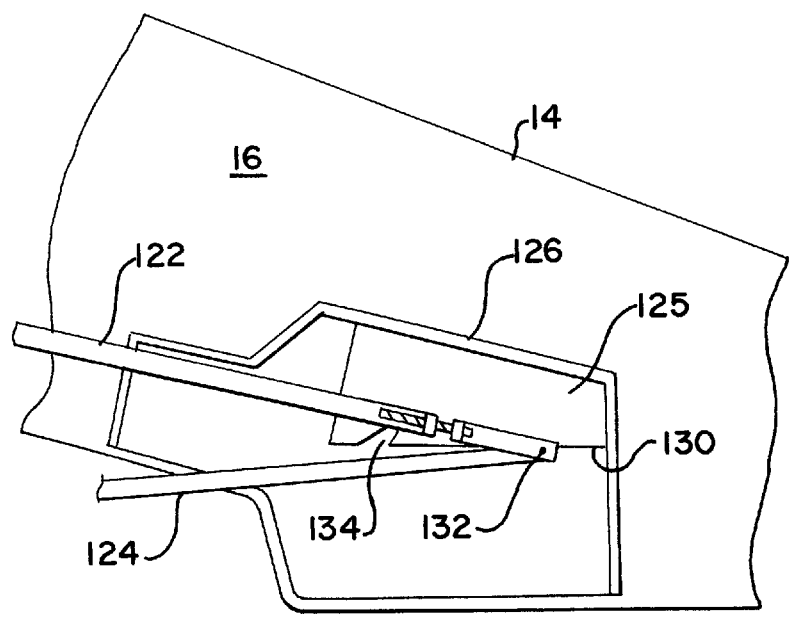
FIG. 11 is an alternative embodiment of the jackknife support system and divider support bracket shown in FIG. 8.
Figure 12:
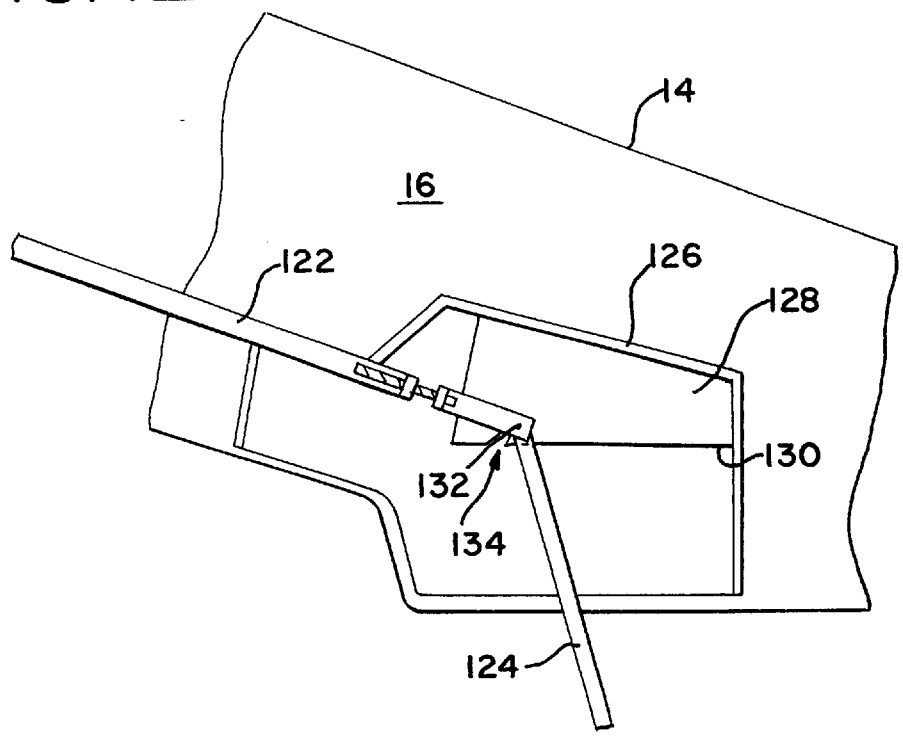
FIG. 12 is an alternative embodiment of the jackknife support system and divider support bracket shown in FIG. 10.

An alternative embodiment of the jackknife support system and the divider support bracket is shown in FIGS. 11 and 12, which correspond to FIGS. 8 and 10, respectively. This embodiment comprises a tension frame 122 pivotally connected to a compression frame 124, both of which are manufactured from metal bar stock or castings. The divider support bracket 126 comprises a vertical guide plate 128. The lower most edge 130 of the guide plate 128 rests on the pin 132 connecting the tension frame 122 to the compression frame 124. In other words, the guide plate 128 is sandwiched between the compression frame 124 and the tension fame 122. A notch 134 is formed in the lower most edge 130 of the guide plate 128 towards the rearward end of the divider support bracket 126. Other aspects of the alternative jackknife support system are as described above in connection with the preferred embodiment.

Alternatively, the tension and compression frames 122 and 124 could each comprise a U-shaped frame wherein a pair of pins 132 connects the legs of the respective frames together. The divider support bracket 126 would consequently comprise a pair off guide plates 128, each guide plate 128 being supported on one of the pins 132.

FIG. 11 shows the position of pin 132 when the divider 14 and hood 22 assembly is in the operating position. In this position, the guide plate 128 rests on top of pin 132. FIG. 12 shows the position of pin 132 when the row unit is in the jackknife position. In this position, pin 132 is engaged in notch 134. Movement of the divider 14 and hood 22 assembly between the operating position and the jackknife position is as described generally above in connection with the preferred embodiment.

It should be appreciated that the apparatus of the present invention is capable of being incorporated in the form of a variety of embodiments, only a few of which have been illustrated and described above. For example, the connection or pivot points of the various components of the jackknife support system can be altered without changing the basic four-bar linkage arrangement of the invention. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All modifications that come within the meaning and range of equivalency of the claims are to be embraced within their scope.

I claim:

1. A combine row crop head having a row unit, wherein said row unit comprises:

a row unit frame connected to the row crop head;

a hood having a forward end and a rearward end wherein said rearward end is pivotally connected to said row unit frame and said forward end is removably connected to said row unit frame;

a compression member pivotally connected to said row unit frame;

a tension member pivotally connected between said hood and said compression member; and a divider pivotally connected to said hood and supported by said compression member.

2. The row crop head of claim 1 wherein the forward end of said hood is disconnected from said row unit frame to permit said hood and said divider to be jackknifed into a storage position.

3. The row crop head of claim 2 wherein a four-bar linkage is formed by the interconnection of said row unit frame, said hood, said compression member, and said tension member.

4. The row crop head of claim 2 wherein said compression member engages said divider to hold said hood and said divider in a jackknifed storage position.

5. The row crop head of claim 1 wherein said divider further comprises a bracket, said bracket being supported by an end of the compression member.

6. The row crop head of claim 5 wherein said bracket further comprises a means for engaging said end of said compression member when said hood and said divider are in a jackknifed storage position.

7. The row crop head of claim 1 wherein said tension member further comprises a length adjustment mechanism to change the length of the tension member.

8. The row crop head of claim 7 wherein the length of said tension member is changed to alter the angle of the divider relative to the row unit frame.

9. The row crop head of claim 7 wherein said tension member comprises two structures connected together by a nut and bolt and the length of said tension member is changed by rotating said nut relative to said bolt.

10. The row crop head of claim 1 wherein said hood comprises a first hood and a second hood, and further wherein said divider comprises a first divider and a second divider, said first hood and said first divider being located adjacent to a first side of said row unit, and said second hood and said second divider being located adjacent to a second side of said row unit.

11. A combine cornhead having a plurality of adjacent and equally spaced row units supported by a transverse frame, wherein each of said row units comprises a pair of divider/hood assemblies, each divider/hood assembly comprising:

a) a row unit frame connected to the cornhead transverse frame;

b) gathering and harvesting machinery supported on the row unit frame;

c) a semi-circular shaped hood having a forward end and a rearward end, said rearward end being pivotally connected to the row unit frame;

d) a disengagable latching mechanism connecting the forward end of said hood to the row unit frame;

e) a compression member having a first end and a second end, said first end being pivotally connected to the row unit frame;

f) a tension member having a first end and a second end, said first end being pivotally connected to the hood, said second end being pivotally connected to the compression member; and g) a semi-conical shaped divider having a base pivotally connected to said forward end of said hood, said divider being supported by the second end of said compression member.

12. The cornhead of claim 11 wherein the latching mechanism is disengaged to disconnect said forward end of said hood from said row unit frame so as to permit said hood and said divider to be jackknifed into a storage position.

13. The cornhead of claim 12 wherein a four-bar linkage is formed by the interconnection of said row unit frame, said hood, said compression member, and said tension member.

14. The cornhead of claim 12 wherein said second end of said compression member engages said divider to hold said hood and said divider in a jackknifed storage position.

15. The cornhead of claim 11 wherein said divider further comprises a bracket, said bracket being supported by said second end of said compression member.

16. The cornhead of claim 15 wherein said bracket further comprises a means for engaging said second end of said compression member when said hood and said divider are in a jackknifed storage position.

17. The cornhead of claim 11 wherein said tension member further comprises a length adjustment mechanism to change the distance between said first end and said second end of said tension member.

18. The cornhead of claim 17 wherein the distance between said first end and said second end of said tension member is changed to alter the angle of the divider relative to the row unit frame.

19. The cornhead of claim 18 wherein said tension member comprises two frames connected together by a nut and bolt and the distance between said first end and said second end of said tension member is changed by rotating said nut relative to said bolt.

20. The cornhead of claim 11 wherein said compression member comprises a U-shaped tubular metal frame.

21. The cornhead of claim 11 wherein said hood and said divider are each formed from molded plastic.

22. The cornhead of claim 11 wherein said hood and said divider are each manufactured from sheet metal.

23. The cornhead of claim 11 wherein said connection of the second end of said tension member to said compression member is near the second end of said compression member.

24. A jackknifing cornhead comprising a hood pivotally connected between a divider and a row unit frame, said divider being supported by a four-bar linkage formed by a tension member and a compression member interconnected between said hood and said row unit frame, wherein said four-bar linkage is movable between an operating position and a storage position.

25. The jackknifing cornhead of claim 24 wherein the orientation of said compression member is substantially horizontal when in the operating position and is substantially vertical when in the storage position.

26. The jackknifing cornhead of claim 24 wherein the hood is fixedly connected to the row unit frame when in the operating position and is pivotally connected to the row unit frame when in the operating position.

\* \* \* \* \*